US006220134B1

(12) United States Patent

Thiel et al.

(10) Patent No.: US 6,220,134 B1

(45) Date of Patent: *Apr. 24, 2001

(54) DEVICE FOR SEPARATING MATERIAL WEB SECTIONS FROM A MOVING ENDLESS MATERIAL WEB

(75) Inventors: Karl-Heinz Thiel, Neuwied; Werner J. Reichstein, Wenden, both of (DE)

(73) Assignee: Winkler + Dünnebier AG, Neuwied (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/189,029

(22) Filed: Nov. 10, 1998

(30) Foreign Application Priority Data

Dec. 18, 1997 (DE) ........................................ 197 56 395

(51) Int. Cl.[7] ........................................ B23Q 15/02

(52) U.S. Cl. ........................................ 83/74; 83/286

(58) Field of Search ........................ 83/286, 295, 299, 83/74, 367, 368, 371

(56) References Cited

U.S. PATENT DOCUMENTS 5,241,884 9/1993 Smithe et al. .

FOREIGN PATENT DOCUMENTS 0 543 493A1 5/1993 (EP) .

*Primary Examiner*—Rinaldi I. Rada
*Assistant Examiner*—Amar Flores-Sánchez
(74) *Attorney, Agent, or Firm*—Collard & Roe, P.C.

(57) ABSTRACT

The invention relates to a rotating cutting device for producing letter envelope cuts from a printed endless, moving material web. The position of the cut is pre-set by register marks printed on the web. In this process, the cutting device is fully automatically synchronized with the register marks. This is accomplished via a computer-supported controller which, via sensors, first determines the spacing between two adjacent marks, then adjusts the cutting device to the determined length of the section, and finally continually monitors the phase position between the knife and the register mark and changes the phase position by slightly accelerating or slowing down the material web until the cut and the register mark coincide.

1 Claim, 1 Drawing Sheet

DEVICE FOR SEPARATING MATERIAL WEB SECTIONS FROM A MOVING ENDLESS MATERIAL WEB

BACKGROUND OF THE INVENTION

1. Field of the Invention

The present invention relates to a device for separating material web sections from a moving endless material web. In particular, this invention relates to a device for separating material web sections in conformity with print marks applied to the web for separating letter envelope cuts from a printed paper web.

2. The Prior Art

In the manufacture of letter envelopes from a continuous web, individual cuts are formed by a rotating knife (or cutter) roll, which cooperates with a counter roll or counter bar. The paper web is pulled from a supply roll of paper by take-off or feed rolls and pushed between the knife roll and the counter roll. After the separation cut has been made, the cut letter envelope is received by transporting means, and fed to further processing operations. The length of the letter envelope cuts is determined by the length of the material web pushed by the feed rolls between two cutting operations into the roll gap between the knife roll and the counter roll. It is common practice to operate the knife or cutter roll as a so-called cycled roll, i.e., to have it rotating with the speed of the machine and to obtain or effect a change in length exclusively by changing the raze of revolution and thus by changing the rotational steed of the feed rolls transporting the material web.

This was accomplished in the early stages of letter envelope machine engineering by exchangeable toothed gears in the feed roll drive. This means that only stepped changes in length were possible.

Because of this problem, infinitely variable speed transmissions and differential drives were employed later instead. Processor-controlled individual drives have been increasingly used in more recent years in machine engineering. These drives provide the opportunity to change the relative speed between feed rolls and the knife or cutter roll within wide limits and without additional expenditure. However, problems arise if a highly defined cutting position must correspond with a mark applied to the web. This is normally the case in connection with preprinted webs, where the cut must conform to the print pattern. The print pattern itself may serve as the mark.

However, a special register mark is usually printed on the web for marking the spot or point through which the cut has to extend.

The length of the cuts is therefore preset by the spacing of the marks relative to each other.

This makes manual adjustments of the line of the cut extremely difficult, because in addition to the length of the section, the phase position of the cut relative to the mark must be accounted for. This is complicated further by the fact that after the necessary adjustments have been made, even the most minor remaining or future feed errors later can lead to visible summation errors and require additional corrective intervention.

Therefore, the course or line of the cut must be constantly monitored by the operating personnel.

A system is known from U.S. Pat. No. 5,241,884 which discloses that after the length of the cut has been basically adjusted by hand, the system automatically sets itself to a correct course or line of the cut via register marks applied to the material web.

The cutting roll is rigidly coupled to the main drive train of the machine, whereas the feed rolls are equipped with their independent drive in the form of a servo-motor.

Sensors are arranged both on the knife or cutting roll and the pair of feed rolls. These sensors are connected to a processor in the machine control unit. The sensor on the knife roll constantly detects the position of the knife or cutter and the sensor on the pair of feed rolls detects the rate of revolutions or rotational speed of the pair of feed rolls. Furthermore, the length of the cuts, which is determined by measuring the spacing between the marks, is manually entered via a keyboard. Based on these values, the processor computes the required relative speed between the pair of feed rolls and the knife roll or cutter and adjusts the feed roll drive accordingly. This leads to cuts having the length corresponding to the entered spacing of the marks. What remains to be adjusted, provided that the length input is correct, is the phase position of the cut relative to the mark. For this purpose, an optical sensor is arranged on the material web, which responds to the register marks and reports or signals the detection of such a mark to the processor. Based on the knowledge of the instantaneous position of the mark and the knife and the moving speeds, the processor determines where the knife or cutter will cut or separate the material web relative to the register mark. If the processor finds that the cut and the mark do not coincide, the rate of revolutions or rotational speed of the feed rolls is changed to reduce the errors until the desired course or line of the cut is obtained.

The drawback of this solution is that to start up the cutting device, it is first necessary to determine the mark spacing in order to enter this spacing by hand.

SUMMARY OF THE INVENTION

It is therefore an object of the present invention to create a cutting device which fully automatically sets itself to the marks printed on a web of material.

This and other objects of the invention are accomplished by a device for separating the material web comprising a rotating knife roll having a cutting edge and a pulse emitter arranged on the knife roll to continually detect the position of the cutting edge. There are a pair of feed rolls for taking the material web off of a supply roll and bringing it near the knife roll. There is a second pulse emitter arranged on the feed rolls for detecting the rate of revolutions of the feed rolls. There is a sensing means disposed above the material web for generating a pulse when a mark on the web is detected, and means for evaluating the signals of the sensing means in conjunction with the pulses of pulse emitters to detect the position of the mark relative to the cutting edge and the spacing between two marks on the material web.

The system according to the invention avoids the circumstances and error possibilities connected with the determination and manual input of the mark spacing.

BRIEF DESCRIPTION OF THE DRAWINGS

Other objects and features of the present invention will become apparent from the following detailed description considered in connection with the accompanying drawing which discloses two embodiments of the present invention. It should be understood, however, that the drawing is designed for the purpose of illustration only and not as a definition of the limits of the invention.

In the drawings, wherein similar reference numbers refer to similar elements throughout the several views.

DETAILED DESCRIPTION OF PREFERRED EMBODIMENTS

Figure 1:
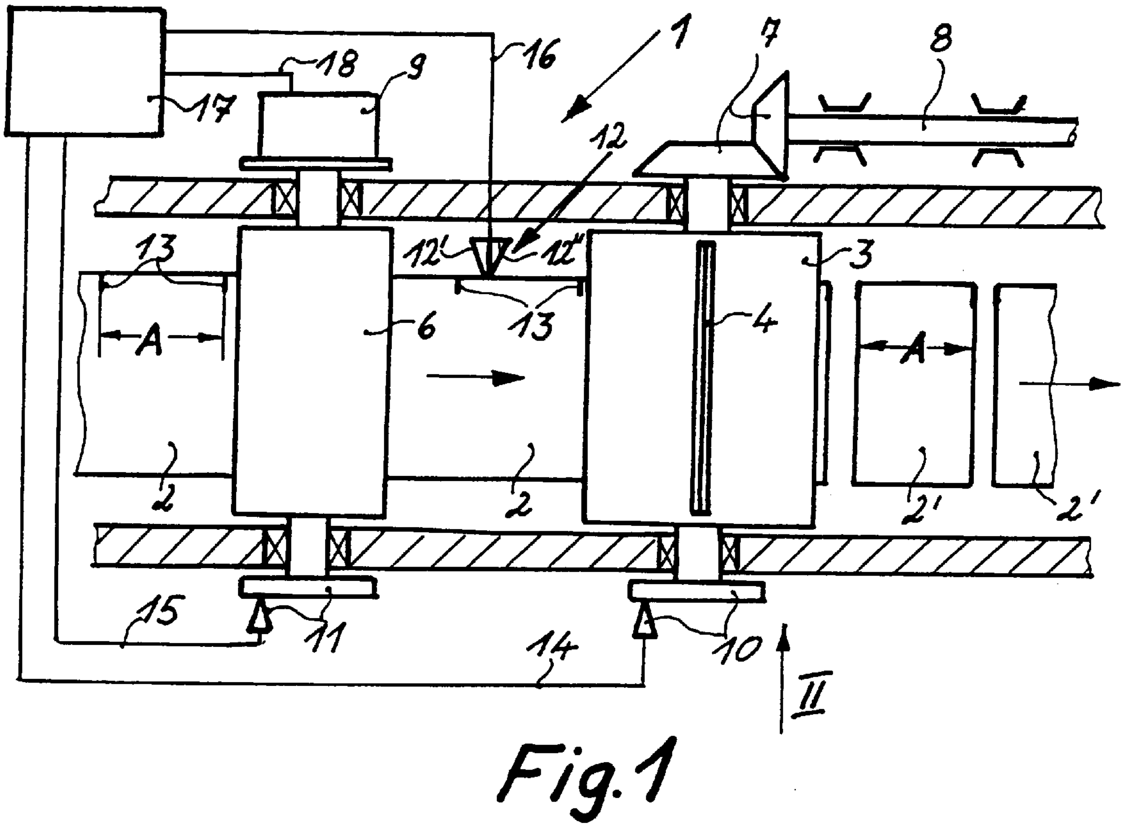
FIG. 1 is a schematic top view of the part or station of a letter envelope production machine where letter envelope cuts are cut to length.
Figure 2:
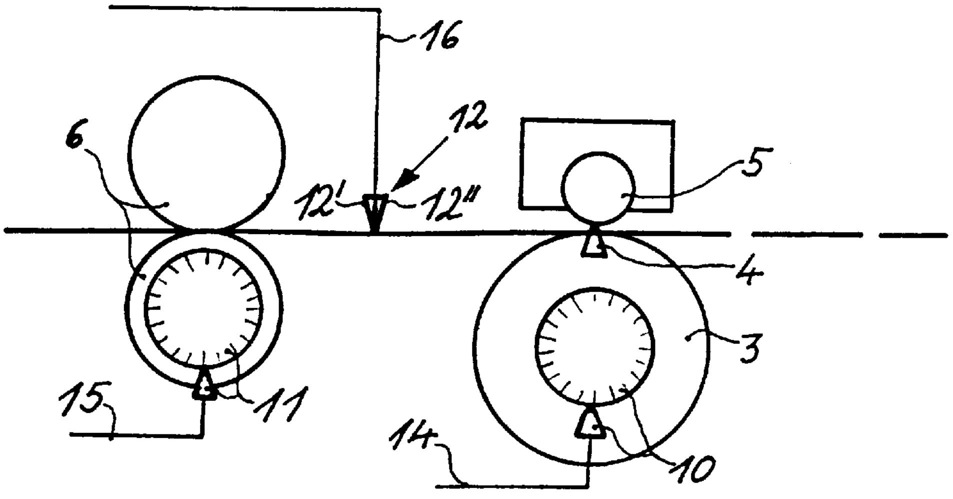
FIG. 2 is a schematic side view of the letter envelope production machine according to FIG. 1, viewed in the direction of arrow II.

Referring in detail to the drawings, FIGS. 1 and 2 show a cutting station 1 for producing letter envelope cuts 2' from an endless material web 2. Cutting station 1 is arranged between a supply roll (not shown here), from which material web 2 is taken off, and known processing stations (also not shown here) downstream for folding and gumming cuts 2' formed in the cutting process. The core piece or component of cutting station 1 is a knife or cutter roll 3 rotatably supported in the machine frame. Knife roll 3 has a blade-like cutting edge which operates against a so-called "anvil" or counter roll 5 in the known manner.

A pair of take-off and feed rolls 6 is arranged upstream of knife roll 3. Knife roll 3 is driven synchronously with the processing stations downstream (not shown here), either via a servo-motor electrically coupled with the drives of the processing stations downstream, or in the conventional manner, as shown in the drawing, via a gear drive 7, which taps the rotational motion from a main driving shaft 8 extending over the entire length of the machine. The drive of feed roll pair 6 is independent of the drive of the knife roll and takes place via a servo-motor 9.

A pulse transmitter 10 is mechanically coupled with knife roll 3. Transmitter 10 breaks up the rotational motion of the roll into a pulse sequence of, for example 10,000 pulses per revolution, and the position of cutting edge 4 is continually detected via transmitter 10. The drive of feed roll pair 6 is coupled with a pulse transmitter 11 with the same or a similar breakdown as well. Transmitter 11 is already integrated in servo-motor 9 in most cases. However, it is shown here as a separate component for illustration purposes. Optical sensors 12' and 12" are arranged above material web 2. Both sensors respond to register marks 13, which are printed on material web 2. The pulses generated by sensors 12' and 12" are evaluated for different purposes. However, as the pulses are always derived from register marks 13, sensors 12' and 12" may be combined into one common sensor 12, which represents an alternative embodiment of the invention. The pulses of sensor 12 are used for the one or other purpose as required, as it is explained hereinafter in greater detail.

Both the two pulse emitters 10 and 11 on knife roll 3 and, respectively, feed roll pair 6 and the optical sensor 12 emit electrical signals, which are supplied via data transmission lines 14, 15, 16 to a computer-supported controller 17, and interpreted in controller 17 by a processor. Controller 17 in turn controls, in a manner not shown here, the main drive of the machine and thus also the drive of knife roll 3. Controller 17 also controls servo-motor 9 via a control line 13, for dividing the pair of feed rolls 6.

As mentioned before, the rate of revolutions of feed roll pair 6 varies independently of the rate of revolutions or rotational speed of the remaining machine via servo-motor 9. This permits a change in the length of the material web fed per machine cycle, or per rotation of knife roll 3, and thus a change in the length of cuts 2'.

In the present case, the length of cuts 2' has to correspond with spacings A of register marks 13, and the cut has to be made through register marks 13. This is accomplished with the cutting device according to the invention as follows: It is assumed that a new material web 2 provided with register marks 13 has been placed in the machine. The spacing of register marks 13 is unknown, to begin with. As soon as the operating personnel starts the machine, pulse emitters 10 and 11 on knife roll 3 and feed roll pair 6 and the sensor 12 are activated, and the pulses generated by these elements are supplied to the computer-supported controller 17 via data transmission lines 14, 15 and 16.

Based on these values and knowing the instantaneous number of revolutions or rotational speed of the machine and the roll diameter, computer-supported controller 17 automatically adjusts cutting device 1. This process can be divided in three steps:

(a) Determination of the mark spacing.

(b) Adjustment of the rate of revolutions of the pair of feed rolls so that the material web is advanced per operating cycle of the knife roll by a distance of A=mark spacing.

(c) Detection of the phase position between register mark 13 and cutting edge 4 and correction of the feed speed of feed roll pair 6 until the cut extends through register mark 13.

In the first step (a), the computer determines spacing marking A by counting the pulses of pulse emitter 11 on feed roll pair 6 that are emitted between two pulses of optical sensor 12, and then computing based on this count the resulting feed or advance motion of material web 2. In step (b), the computer evaluates the pulses of pulse emitters 10 and 11 in order to adjust the rate of revolutions of feed roll pair 6 relative to the rate of revolutions of knife roll 3 in the manner specified in (b).

In the third step (c), which is the normal operating condition of cutting device 1, the pulses of optical sensor 12 and of pulse emitter 10 on knife roll 3 are continually evaluated. In this process, the computer determines where knife 4 is located when register mark 13 passes optical sensor 12. Based on the knowledge of the feed or advance motion of material web 2 and of the circumferential speed of knife roll 3, the computer determines the position of the cut to be expected relative to register mark 13. If the cut and the register mark do not coincide, the computer changes the rate of revolutions of the pair of feed rolls and thus the speed of the web to reduce the error until the desired course of the cut has been obtained.

Cutting device 1 operates in this condition in a completely stable way. Any sign or a change occurring in the course or line of the cut, including interference introduced externally, such as by a change in the speed of the machine, is detected immediately and controlled for correction as required.

Accordingly, while only a few embodiments of the present invention have been shown and described, it is to be understood that many changes and modifications may be made thereunto without departing from the spirit and scope of the invention as defined in the appended claims.

What is claimed:

1. A device for separating material web sections from a moving endless material web in conformity with marks applied to the web, comprising:

a rotating knife roll having a cutting edge;

a first pulse emitter arranged on said rotating knife roll and adapted to continually detect the position of the cutting edge;

a pair of feed rolls adapted to take off the material web from a supply roll and transport the material web into an active range of the knife roll;

a second pulse emitter arranged on the pair of feed rolls and adapted to detect the rate of revolutions of the pair of feed rolls;

sensing means adapted to scan the material web and generate a pulse when a mark is detected, said sensing means comprising a single sensor that alternates between measuring the position of the mark relative to the position of the cutting edge and measuring the distance between two marks at the start of the cutting operation; and means for evaluating the signals of said sensor in association with the pulses of the first pulse emitter to determine the position of the mark relative to the position of the cutting edge and to adjust the speed of the web so that the cutting edge cuts the mark, and for evaluating the signals of the sensor in association with the pulses of said second pulse emitter on the feed roll pair to determine the spacing between two marks at the start of the cutting operation.

* * * * *